United States Patent [19]

Hinschlager et al.

[11] Patent Number: 5,219,104
[45] Date of Patent: Jun. 15, 1993

[54] SPORTS ARTICLE HANDLEBAR PAD

[75] Inventors: Robert A. Hinschlager, Mendon; William T. Ragon, Celina, both of Ohio

[73] Assignee: Huffy Corporation, Miamisburg, Ohio

[21] Appl. No.: 806,367

[22] Filed: Dec. 13, 1991

[51] Int. Cl.⁵ .............................................. A63B 37/00
[52] U.S. Cl. ........................ 224/30 A; 273/58 A; 273/58 K; 273/65 EE; 273/65 EG; 428/11
[58] Field of Search ............... 428/7, 11; 224/30 A; 273/58 A, 58 K, 65 EE, 65 EG

[56] References Cited

U.S. PATENT DOCUMENTS

| | | | |
|---|---|---|---|
| 3,968,912 | 7/1976 | Horwitz | 224/36 |
| 4,105,220 | 8/1978 | Pacific | 428/31 X |
| 4,176,770 | 12/1979 | Griggs et al. | 248/682 X |
| 4,244,497 | 1/1981 | Lee | 224/36 |
| 4,284,217 | 8/1981 | Johnston et al. | 224/30 R |
| 4,396,135 | 8/1983 | Lundgren | 224/39 |
| 4,541,555 | 9/1985 | Miree | 224/41 |
| 4,637,534 | 1/1987 | Leppek | 224/36 |
| 4,852,778 | 8/1989 | Beiser et al. | 224/36 X |
| 4,978,964 | 12/1990 | Castille | 428/11 X |
| 4,981,243 | 1/1991 | Rogowski | 224/36 X |

*Primary Examiner*—Henry F. Epstein
*Attorney, Agent, or Firm*—Biebel & French

[57] ABSTRACT

A sports article attached to a crossbar of a bicycle handlebar such that it can be removed and used as a sports article. The sports article provides impact protection on the crossbar and adds to the attractive appearance of the bicycle.

10 Claims, 5 Drawing Sheets

SPORTS ARTICLE HANDLEBAR PAD

BACKGROUND OF THE INVENTION

This invention relates to sports articles which can be transported on a bicycle for use as a pad on the bicycle, and more specifically to a sports article, adapted to be received and carried by a handlebar of a bicycle, thereby providing protective padding which can be removed and used as a sports article.

There is a need for an attractive impact pad for a crossbar of a handlebar on a bicycle. In the past there have been pads, such as is disclosed in U.S. Pat. No. 4,105,220 issued to Pacific, which are attached to a crossbar. These pads are not attractive and only provided a single function of impact protection. Thus it is desired to have an attractive pad that has a second function, such as a sports article.

It has also been difficult to carry and transport sports articles, such as a football or basketball, while riding a bicycle. Such transporting required a person to free one hand from the bicycle handlebar, while riding, in order to carry the sports article. This causes a dangerous and unstable situation due to a person steering the bicycle with only one hand. It is desired that a sports article be adapted to be transported on a bicycle in such a manner that it does not require the person riding the bicycle to release his hands from the bicycle handlebars.

There have been attempts to provide a means to attach a ball to a bicycle handlebar. Such an attempt is shown in U.S. Pat. No. 4,284,217 issued to Johnson, which shows a carrier for an inflatable ball which fits into the valve of the ball and engages the bicycle handlebar. The Johnson device permits the ball to hang directly below the handlebars which may act to hinder steering of the bicycle as the ball passes close to the bicycle frame and may obstruct the front reflector.

Another attempt has been U.S. Pat. No. 4,244,497 issued to Lee which shows a ball rack which is attached to a bicycle's handlebars. The rack is a single resilient wire shaped to conform to the exterior of a ball whereby the ball may be held inside the rack.

While the prior devices provide means for conveniently holding a ball, carrying balls in the manner disclosed acts to detract from the appearance of the bicycle on which the devices are attached, and the devices do not provide any protection in the event that the operator contacts the handlebars.

Accordingly, there is a need for a combined bicycle pad and sports article which is adapted to be attached to a bar of a bicycle, such as a crossbar, and which can be conveniently transported by the bicycle to a playing field or other location and which can then be detached from the bicycle for use in a game. There is also a need for such an article which provides some protection to the rider of the bicycle such that upon impacting the crossbar portion of the bicycle handlebars, the risk of injury will be lessened by the sports article.

In addition, it is desirable to provide an arrangement whereby a sports article is readily available with the bicycle regardless of whether the operator of the bicycle anticipates a need for the sports article. Thus, the sports ball should have a combined utility and further add to the appearance of the bicycle.

SUMMARY OF THE INVENTION

The present invention provides a combined bicycle pad and sports article adapted to be attached to a crossbar portion of a bicycle handlebar whereby the sports article may be transported by the bicycle. The sports article has a body portion formed from resilient material defining an exterior and opposing sides. An elongated aperture extends between the opposing sides passing through a central portion of the sports article defining a central longitudinal axis of the sports article. Each of the sides has an arcuate cross-sectional shape in a direction parallel to the aperture and the sides are formed substantially symmetrically with respect to each other.

A slit extending between the exterior surface and the aperture provides means whereby the sports article can be attached to the crossbar by passing the bar through the slit and into engagement with the aperture. Thus, the crossbar of the bicycle is then located within the aperture, and the sports article is maintained on the handlebar for transportation with the bicycle. The sports article can be removed by pulling on the article such that the bar passes through the slit from the aperture to the exterior.

Therefore, it is an object of the present invention to provide a sports article which is adapted to be received by a bar of a bicycle, such as a crossbar, and which can be transported with the bicycle to various locations such as a playing field.

It is another object of the invention to provide a sports article which is adapted to be attached to a bar of a bicycle and which does not inhibit operation of the bicycle.

Yet another object of the invention is to provide a sports article which is adapted to be attached to a bar of a bicycle, such as a crossbar, and which provides protective padding such that if a person riding the bicycle impacts the bar, the sports article will lessen the impact.

It is still another object of the present invention to provide a sports article which is adapted to be received by the bar of a bicycle and which can be easily removed from the bicycle and used as a sports article.

Furthermore, it is another object of the present invention to provide a sports article adapted to be received by a bar of a bicycle which adds to the attractive appearance of the bicycle.

Other objects and advantages of the present invention will be apparent from the following description, the accompanying drawings and the appended claims.

DETAILED DESCRIPTION OF THE PREFERRED EMBODIMENT

Figure 1:
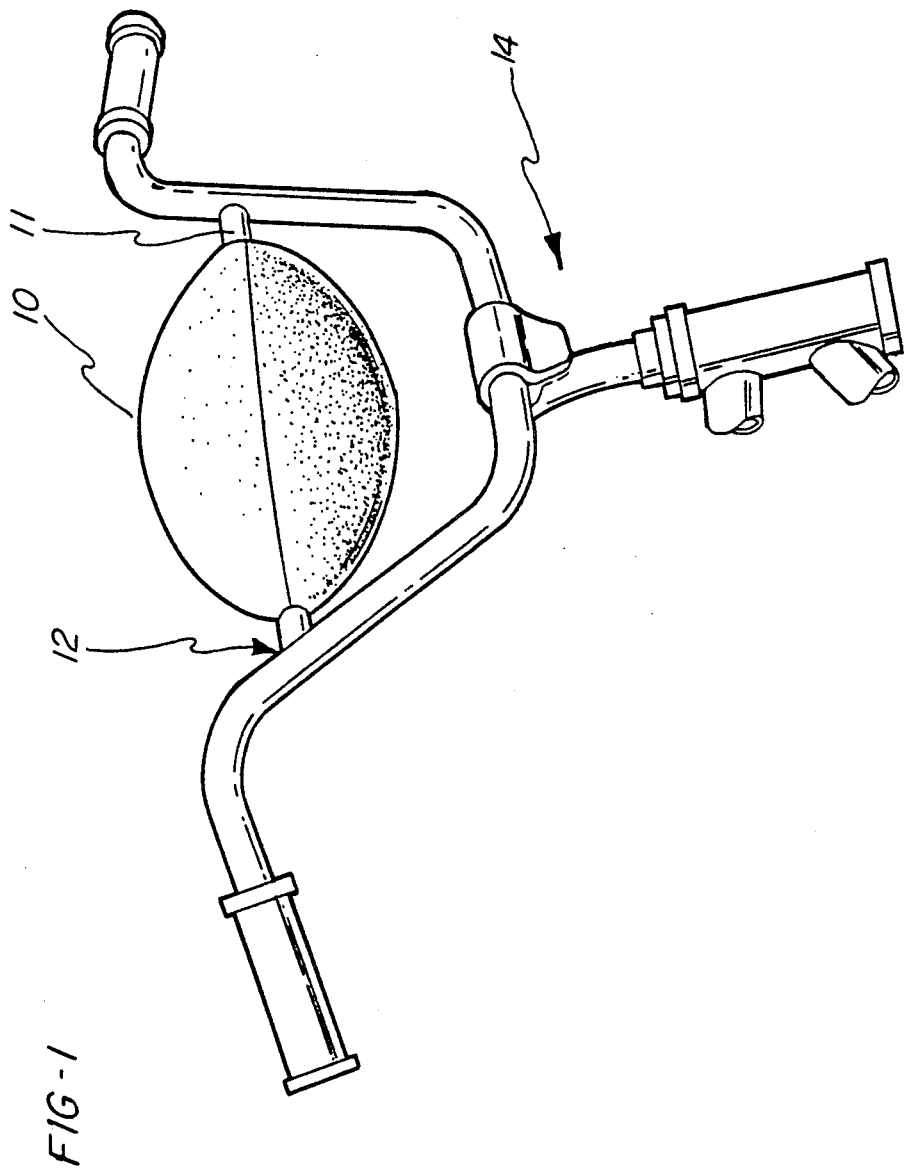
FIG. 1 is a perspective view showing the sports article in the form of a football attached to the handlebar of a bicycle.

Referring to FIG. 1, the sports article 10 of the present invention is shown in the form of an ellipsoid such as a football attached to the crossbar portion 11 of a handlebar 12 for a bicycle 14. As shown, the sports article 10 is firmly attached to the crossbar 11 such that a person may ride the bicycle with both hands on the handlebars 12. Also, the article extends along a substantial portion of the length of the crossbar 11 such that the sports article 10 provides impact protection on the crossbar 11 for preventing injury to the person riding the bicycle 14.

Figure 2:
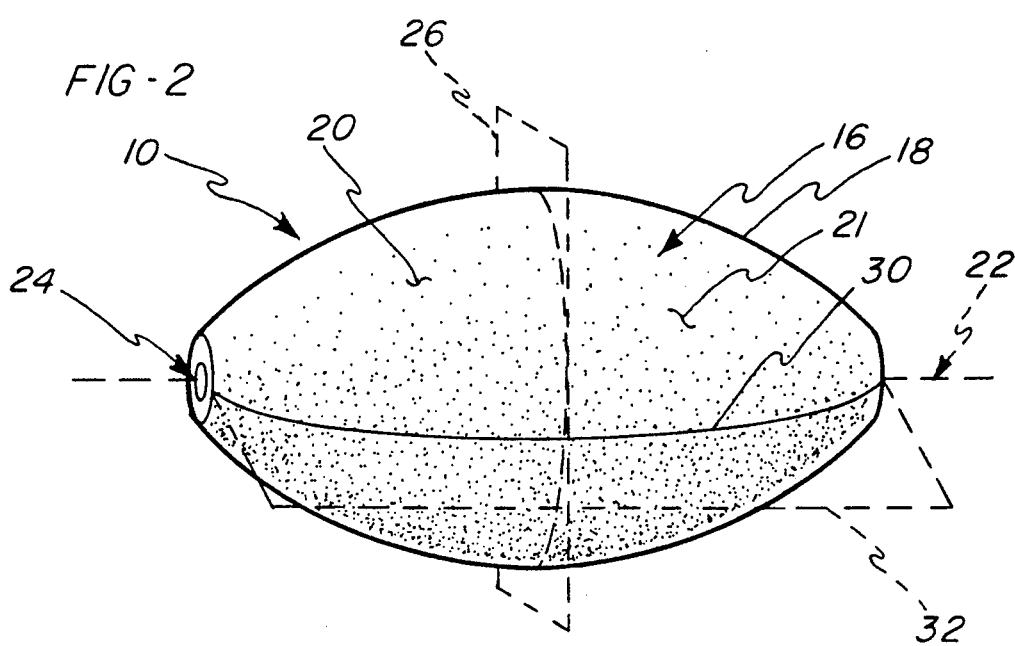
FIG. 2 is a perspective view of the sports article of FIG. 1 and including planes passing through the center of the article.
Figure 3:
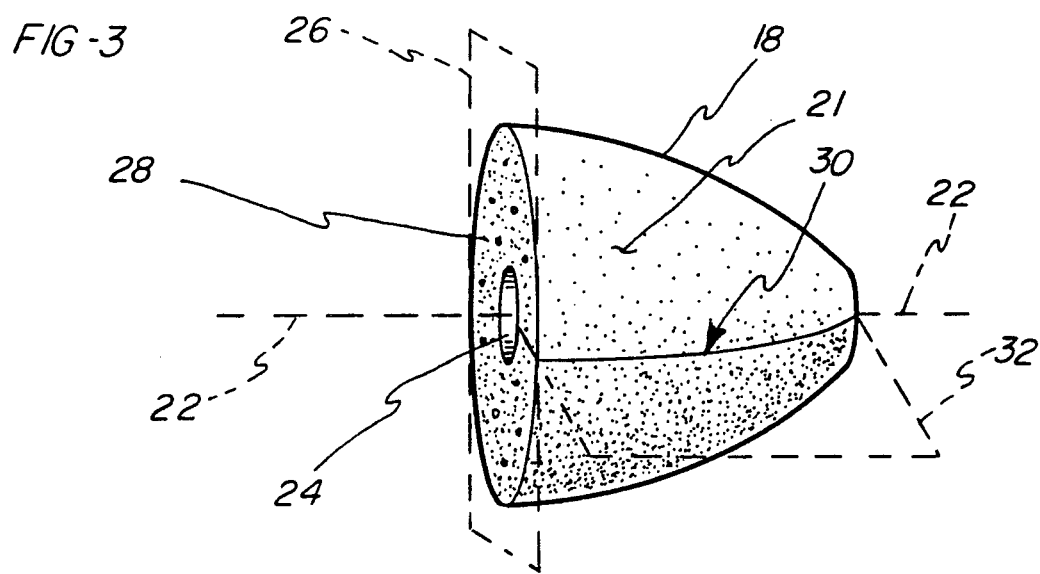
FIG. 3 is a perspective cross-sectional view of the sports article of FIG. 1.

Now referring to FIGS. 2 and 3, the article 10 is shown having a body portion 16 formed of solid resilient material 28 defining an exterior surface 18. The body portion 16 is divided into two opposing sides 20 and 21 located on either side of a plane 26 which passes through the center of the article 10.

Furthermore, the body portion 16 defines an aperture 24 extending between the opposing sides 20 and 21 has an arcuate cross-sectional shape in a direction parallel to the longitudinal axis 22. It should be noted that the plane 26 is oriented perpendicular to the longitudinal axis 22 and that the sides 20 and 21 are substantially symmetrical with respect to each other about the plane 26. In other words, the opposing sides 20 and 21 are mirror images of each other about plane 26.

The body portion 16 also includes means 31 (see FIG. 4) defining a slit 30 which runs from the exterior surface 18 to the aperture 24 along a plane 32 extending parallel to the longitudinal axis 22. The slit 30 extends along the length of the article 10 and permits the article 10 to be opened for allowing passage of the crossbar 11, and the means 31 defining the slit 30 is in the form of opposing substantially planar faces formed in the solid resilient material 28 of the body portion 16.

Figure 4:
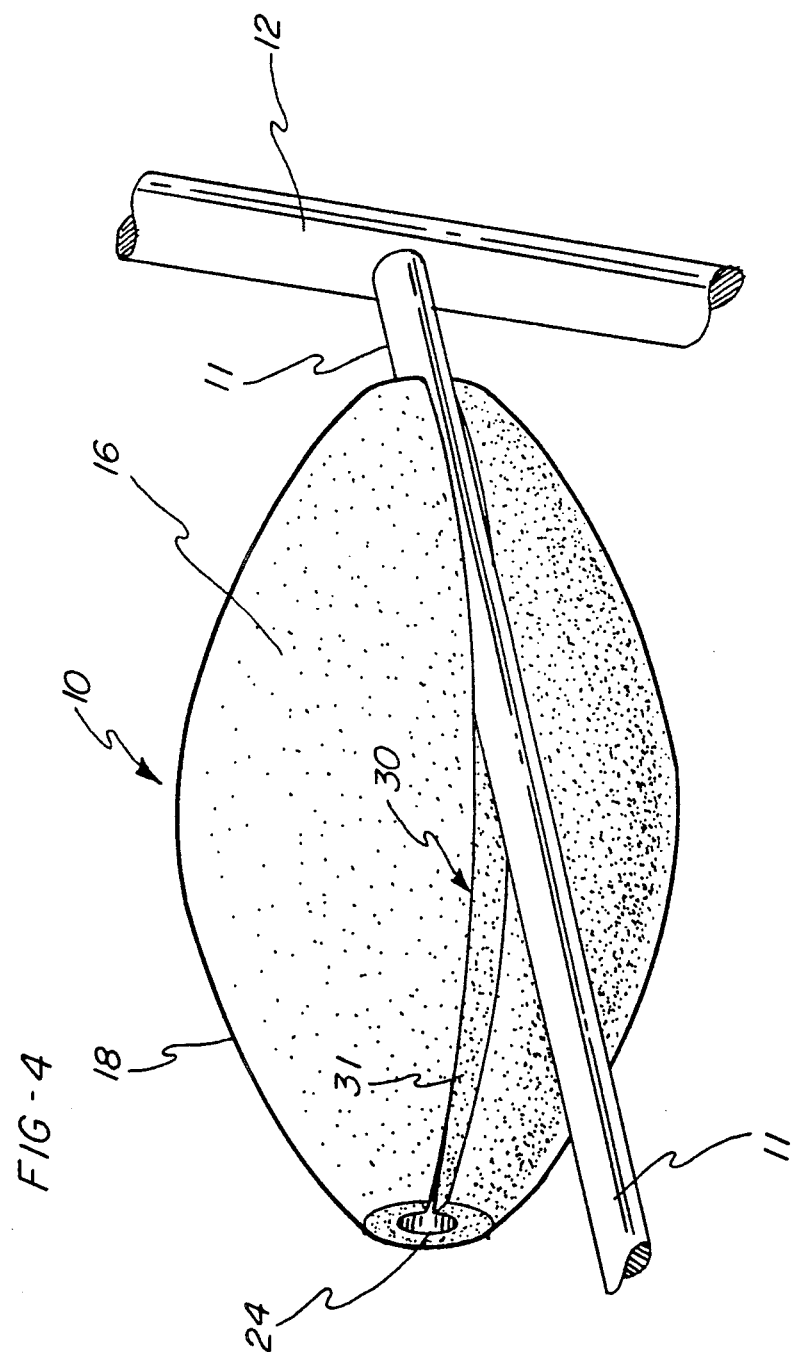
FIG. 4 shows a bicycle crossbar passing through the slit of the sports article.

As may be seen in FIG. 4, the sports article 10 is shown in the process of being attached to the crossbar 11. The crossbar 11 passes through the slit 30 thereby separating the means 31 defining the slit 30. Once the crossbar 11 passes through the slit 30, the walls of the aperture 24 surround the crossbar 11 and the opposing face means 31 defining the slit 30 move into contact with each other to thereby maintain the sports article 10 in position on the crossbar 11.

Positioning the sports article 10 on the crossbar 11 has another function which is equally important to the function of carrying the article in that the article 10 provides a pad extending across a substantial portion of the crossbar 11. Thus, if a person riding the bicycle 14 accidentally impacts the crossbar 11, the article 10 acts as a pad to prevent injury, and since the article 10 is formed symmetrically about the plane 26, an equal degree of impact protection is provided on either side of the plane.

Figure 5:
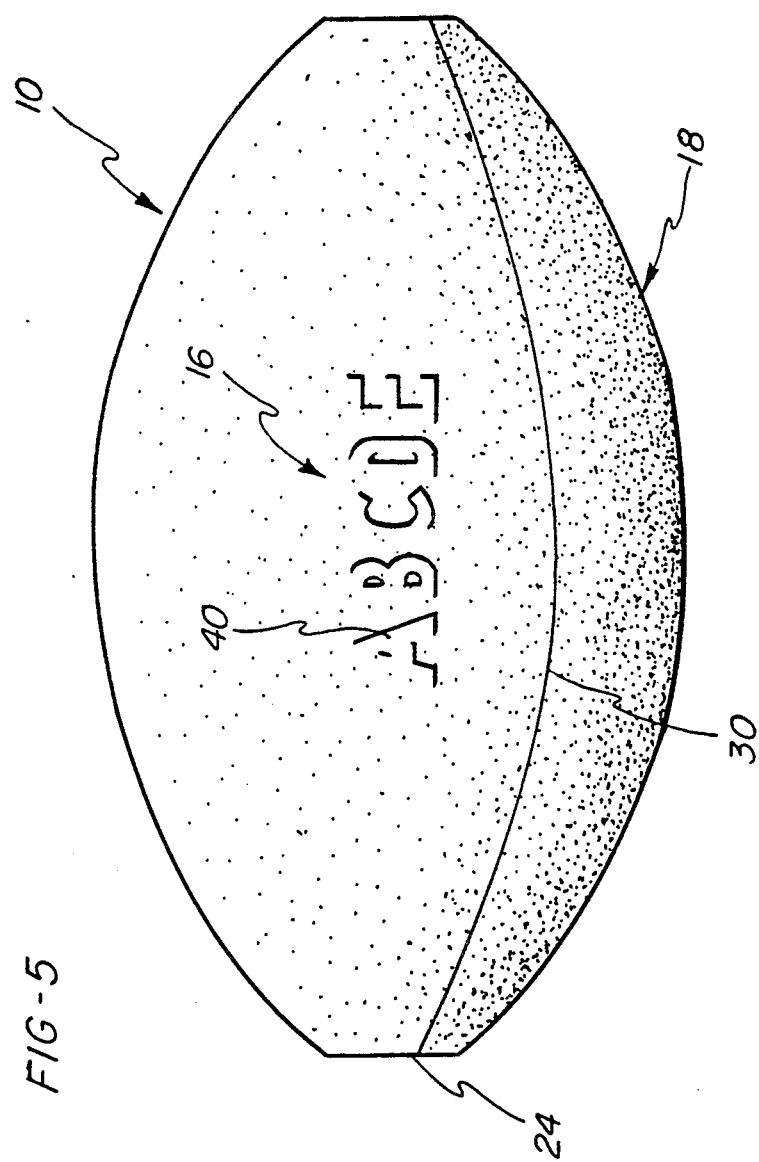
FIG. 5 is a front elevational view of the sports article of FIG. 1 with raised letters providing a finger grip portion of the article.

Referring to FIG. 5, the sports article 10 of FIGS. 1-4 is shown in the shape of a football with a finger grip of lacing portion 40, defined on the body portion 16, as raised letters. This lettering 40 may be in the form of a logo, a name, or may be representative of actual lacing typically found on a football.

Figure 6:
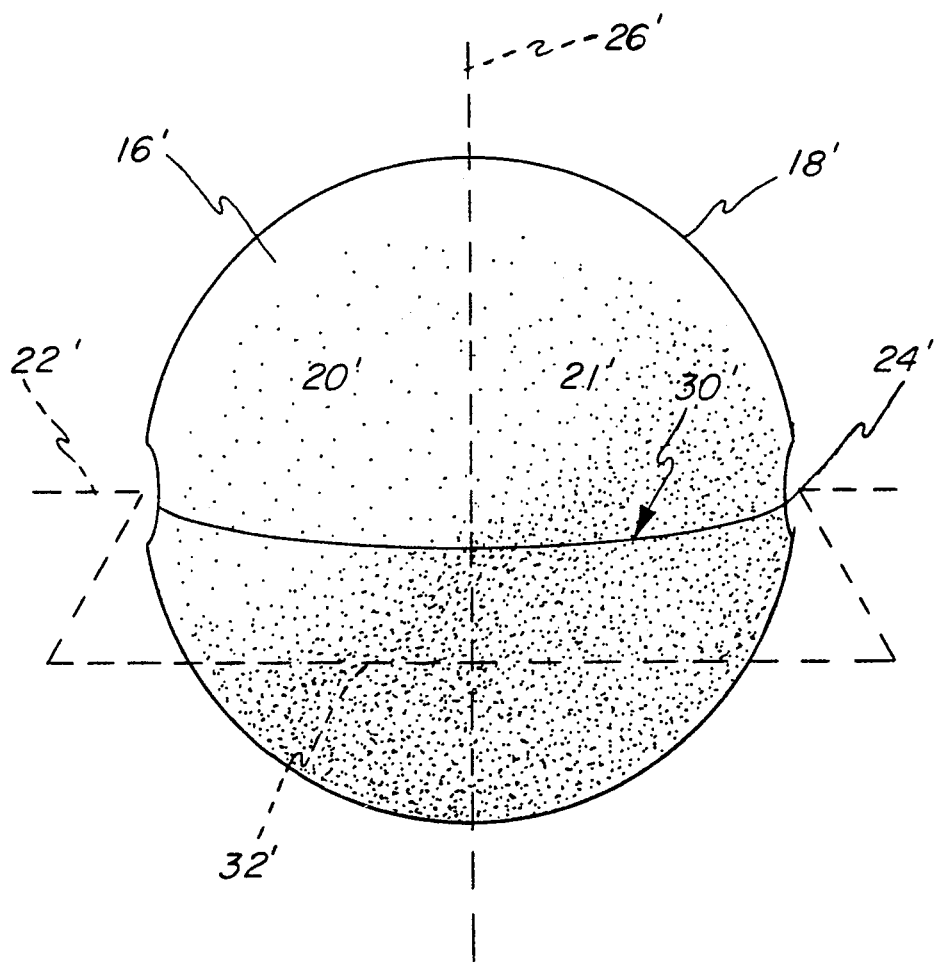
FIG. 6 shows an alternate embodiment of the sports article wherein the article is spherical.

Now referring to FIG. 6, there is shown an alternate embodiment of the sports article 10', in which elements similar to the first embodiment are labeled with the same reference numerals primed. This alternate embodiment is sphere shaped such as may be representative of the shape of a basketball or a soccerball. This embodiment includes body portion 16' formed of solid resilient material, defining an exterior surface 18'. Two opposing sides 20' and 21' are formed symmetrically about a plane 26' such that the opposing sides 20' and 21' are again mirror images of each other about the plane 26'. An aperture 24' is defined through the body 16' and passing between the opposing sides 20' and 21'. A longitudinal axis 22' is defined by the center of the aperture 24'. This alternate embodiment is attached to a crossbar 11 of a bicycle for use as impact protection and is removed for use in a sports activity, as in the previous embodiment.

Finally, it should be noted that the sports article shape of the present invention has an additional advantage in that it acts to increase the attractive appearance of the bicycle in that it covers the crossbar and appears to be integrally attached to the bicycle. Thus, a child using the bicycle will be likely to retain the article of the invention in place on the bicycle regardless whether he or she intends to participate in a sports event using the article. This also has the advantage that it is less likely that the article will be removed during operation of the bike such that it will be normally maintained in position to function as a pad for the crossbar, and if the child should unexpectedly have occasion to play a game such as a game requiring a ball, the sports article will be available for use in the game.

While the form of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. A sports article adapted to be attached to a bar of a bicycle such that said article may be transported by said bicycle, said article comprising:

a body portion formed of a solid resilient material and including an exterior surface defining opposing sides;

means defining an elongated aperture extending between said opposing sides and passing through a central portion of said article, said aperture defining a central longitudinal axis of said body portion;

each of said sides having an arcuate cross-sectional shape in a direction parallel to said longitudinal axis and being formed substantially symmetrically with respect to each other about a first plane perpendicular to said longitudinal axis and passing through said central portion of said article;

a substantially planar interior surface of said solid resilient material defining a slit extending along a second plane from said exterior surface to said aperture wherein said second plane is parallel to and passes through said longitudinal axis; and wherein said article may be attached to a bar of a bicycle by passing said bar through said slit and into engagement with said aperture, and said article may be removed from said bar for use in a sports activity.

2. The article of claim 1 wherein said article is a ball having an ellipsoidal shape to form a football.

3. The article of claim 2 including a finger gripping portion defined by raised letters located on said exterior surface and extending parallel to said longitudinal axis across at least a portion of one of said opposing sides.

4. The article of claim 1 wherein said article is a ball and said opposing sides each define a semi-spherical shape.

5. The article of claim 4 wherein said ball is a sphere.

6. An impact protection article attached to a bar of a bicycle such that said article may be used as a sports article, said article comprising;

a body portion formed of a solid resilient material and including an exterior surface defining opposing sides;

said solid resilient material defining an elongated aperture extending between said opposing sides and passing through a central portion of said article, said aperture defining a central longitudinal axis of said body portion;

each of said sides having an arcuate cross-sectional shape in a direction parallel to said longitudinal axis and being formed substantially symmetrically with respect to each other about a first plane perpendicular to said longitudinal axis and passing through said central portion of said article;

said solid resilient material including a substantially planar interior surface defining a slit extending along a second plane from said exterior surface to said aperture wherein said second plane is parallel to and passes through said longitudinal axis; and wherein said article may be attached to said bar of said bicycle by passing said bar through said slit and into engagement with said aperture, and said article may be removed from said bar for use in a sports activity.

7. The article of claim 6 wherein said article is a ball having an ellipsoidal shape to form a football.

8. The article of claim 6 wherein said article is a ball and said opposing sides each define a semi-spherical shape.

9. The article of claim 8 wherein said ball is a sphere.

10. The article of claim 6 including a finger gripping portion defined by raised letters located on said exterior surface and extending parallel to said longitudinal axis across at least a portion of one of said opposing sides.

* * * * *